US011531564B2

United States Patent
Shil

(10) Patent No.: US 11,531,564 B2
(45) Date of Patent: Dec. 20, 2022

(54) EXECUTING MULTI-STAGE DISTRIBUTED COMPUTING OPERATIONS WITH INDEPENDENT ROLLBACK WORKFLOW

(71) Applicant: VMware, Inc., Palo Alto, CA (US)

(72) Inventor: Suman Chandra Shil, Fremont, CA (US)

(73) Assignee: VMWARE, INC., Palo Alto, CA (US)

(*) Notice: Subject to any disclaimer, the term of this patent is extended or adjusted under 35 U.S.C. 154(b) by 223 days.

(21) Appl. No.: 16/925,142

(22) Filed: Jul. 9, 2020

(65) Prior Publication Data

US 2022/0012091 A1 Jan. 13, 2022

(51) Int. Cl.
*G06F 9/48* (2006.01)
*G06F 9/54* (2006.01)
*G06F 11/30* (2006.01)

(52) U.S. Cl.
CPC ............ *G06F 9/485* (2013.01); *G06F 9/4881* (2013.01); *G06F 9/546* (2013.01); *G06F 11/3006* (2013.01)

(58) Field of Classification Search
CPC ........ G06F 9/485; G06F 9/4881; G06F 9/546; G06F 11/3006
See application file for complete search history.

(56) References Cited

U.S. PATENT DOCUMENTS

| | | | |
|---|---|---|---|
| 9,239,715 B1* | 1/2016 | Jaisinghani | H04L 67/34 |
| 9,588,685 B1* | 3/2017 | Watson | G06F 3/0655 |
| 10,585,656 B1* | 3/2020 | Das | G06F 8/61 |
| 2011/0131448 A1* | 6/2011 | Vasil | G06F 9/546 |
| | | | 718/1 |
| 2015/0163179 A1* | 6/2015 | Maes | G06F 9/541 |
| | | | 709/206 |
| 2019/0065241 A1* | 2/2019 | Wong | G06F 11/0751 |
| 2019/0294504 A1* | 9/2019 | Giannetti | G06F 9/451 |
| 2019/0310881 A1* | 10/2019 | Gupta | G06F 9/45533 |
| 2019/0347168 A1* | 11/2019 | Giannetti | G06F 11/1438 |
| 2020/0250044 A1* | 8/2020 | Sharma | G06F 11/1451 |
| 2022/0067061 A1* | 3/2022 | Mankad | G06F 16/21 |

\* cited by examiner

*Primary Examiner* — Benjamin C Wu
(74) *Attorney, Agent, or Firm* — Loza & Loza, LLP

(57) ABSTRACT

A system and method for executing multi-stage distributed computing operations initiates an operation workflow for a multi-stage distributed computing operation in response to a request to execute the multi-stage distributed computing operation. The operation workflow includes tasks of the multi-stage distributed computing operation that are executed by a plurality of service compute nodes, which are monitored to detect any failures. When a failure of the operation workflow for the multi-stage distributed computing operation is detected, a rollback workflow for the multi-stage distributed computing operation is initiated, which includes rollback tasks that correspond to the tasks of the operation workflow to roll back executed tasks of the operation workflow. The rollback workflow is an independent workflow from the operation workflow.

20 Claims, 11 Drawing Sheets

EXECUTING MULTI-STAGE DISTRIBUTED COMPUTING OPERATIONS WITH INDEPENDENT ROLLBACK WORKFLOW

BACKGROUND

Serverless and microservices-based operations, which are typically executed in a public cloud, such as AWS cloud or Azure cloud, alleviate the need for developers to be concerned about the underlying infrastructure. Thus, developers no longer have to worry about whether there is sufficient resource capacity in the infrastructure or whether configuration of the infrastructure is current, such as security patches for servers.

Serverless and microservices-based operations can be executed by a number of small, discrete service compute nodes, such as functions and microservices, which allows for distributed computing to execute various tasks of the operations. Such distributed computing has many advantages, such as enablement of high availability and ease of horizontal scale out. These advantages may be achieved using asynchronous message passing mechanism, which uses a message broker, such as Kafka and RabbitMQ brokers, and the participant service compute nodes act as subscribers.

In a distributed computing that uses asynchronous message passing mechanism, a long running operation is divided into multiple stages. The responsibility of executing these stages is divided among the participant compute nodes. When a compute node is finished executing a stage, it enqueues a message in the broker with information about the next stage to be executed. This process continues until the operation reaches the terminal stage. If the distributed operation fails in certain stage, a rollback of certain aspects or cleanup must be performed before the operation can be marked as failure. Otherwise, there will be orphan objects, such as orphan virtual private clouds (VPCs) or Elastic Compute Cloud (EC2) instances, left after the failed operation, which may incur unnecessary cost for resource usage of the public cloud.

SUMMARY

A system and method for executing multi-stage distributed computing operations initiates an operation workflow for a multi-stage distributed computing operation in response to a request to execute the multi-stage distributed computing operation. The operation workflow includes tasks of the multi-stage distributed computing operation that are executed by a plurality of service compute nodes, which are monitored to detect any failures. When a failure of the operation workflow for the multi-stage distributed computing operation is detected, a rollback workflow for the multi-stage distributed computing operation is initiated, which includes rollback tasks that correspond to the tasks of the operation workflow to roll back executed tasks of the operation workflow. The rollback workflow is an independent workflow from the operation workflow.

A computer-implemented method for executing multi-stage distributed computing operations in accordance with an embodiment of the invention comprises receiving a request to execute a multi-stage distributed computing operation, initiating an operation workflow for the multi-stage distributed computing operation in response to the received request, the operation workflow including tasks of the multi-stage distributed computing operation, executing the tasks of the operation workflow for the multi-stage distributed computing operation by a plurality of service compute nodes, monitoring the tasks of the operation workflow for the multi-stage distributed computing operation being executed by the plurality of service compute nodes to detect any failures, initiating a rollback workflow for the multi-stage distributed computing operation when a failure of the operation workflow for the multi-stage distributed computing operation is detected, the rollback workflow including rollback tasks for the multi-stage distributed computing operation that correspond to the tasks of the operation workflow to roll back executed tasks of the operation workflow, wherein the rollback workflow is an independent workflow from the operation workflow, and executing the rollback tasks of the rollback workflow for the multi-stage distributed computing operation by the plurality of service compute nodes. In some embodiments, the steps of this method are performed when program instructions contained in a non-transitory computer-readable storage medium are executed by one or more processors.

A system in accordance with an embodiment of the invention comprises memory and at least one processor configured to receive a request to execute a multi-stage distributed computing operation, initiate an operation workflow for the multi-stage distributed computing operation in response to the received request, the operation workflow including tasks of the multi-stage distributed computing operation, execute the tasks of the operation workflow for the multi-stage distributed computing operation by a plurality of service compute nodes, monitor the tasks of the operation workflow for the multi-stage distributed computing operation being executed by the plurality of service compute nodes to detect any failures, initiate a rollback workflow for the multi-stage distributed computing operation when a failure of the operation workflow for the multi-stage distributed computing operation is detected, the rollback workflow including rollback tasks for the multi-stage distributed computing operation that correspond to the tasks of the operation workflow to roll back executed tasks of the operation workflow, wherein the rollback workflow is an independent workflow from the operation workflow, and execute the rollback tasks of the rollback workflow for the multi-stage distributed computing operation by the plurality of service compute nodes.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
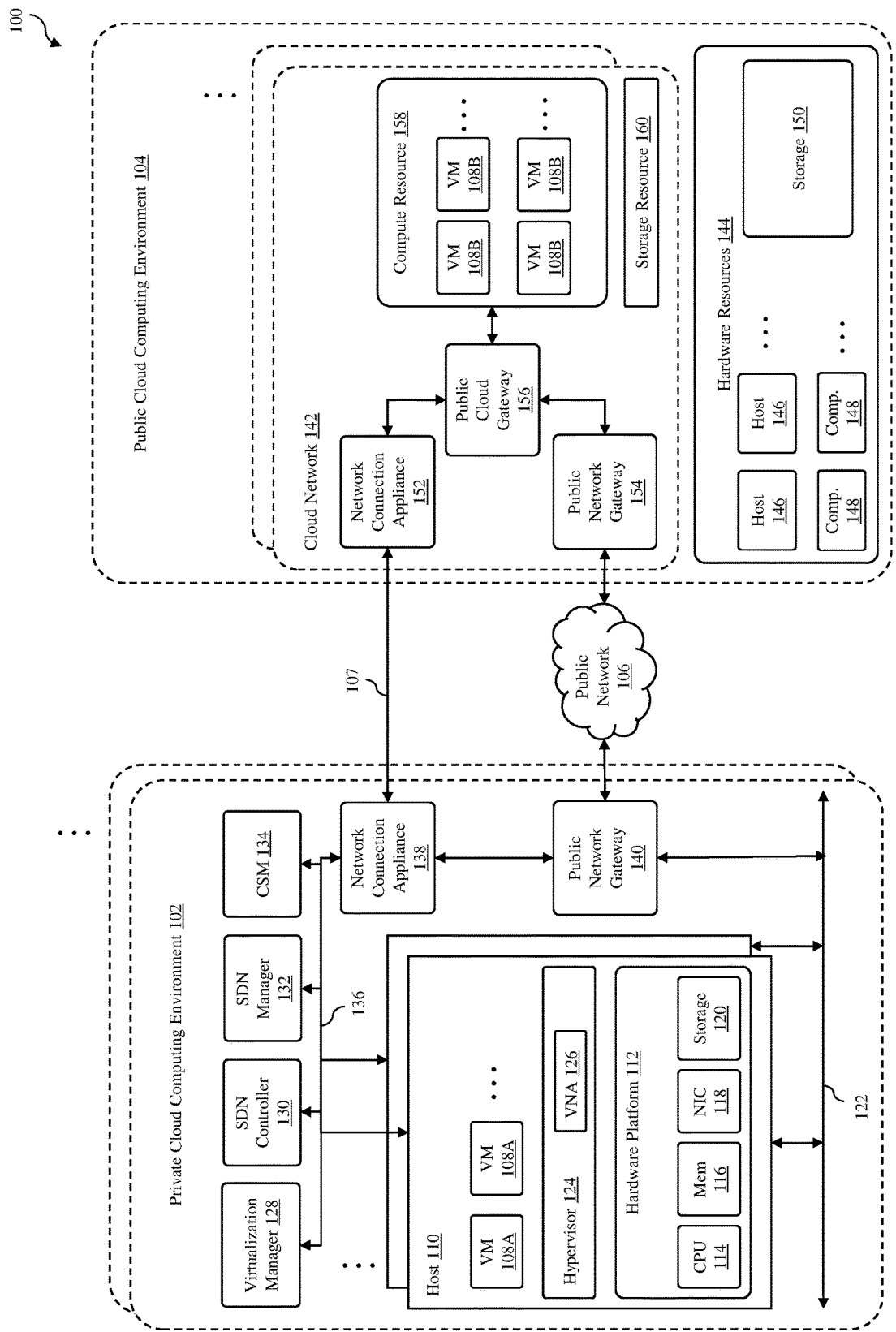
FIG. 1 is a block diagram of a hybrid cloud system that can be used to implement embodiments of the invention.

Turning now to FIG. 1, a block diagram of a hybrid cloud system 100 in accordance with an embodiment of the invention is shown. The hybrid cloud system includes at least one private cloud computing environment 102 and at least one public cloud computing environment 104 that may be connected via a network 106 or a direction connection 107. The hybrid cloud system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders or tenants, such as the particular enterprise in addition to other enterprises. In some embodiments, the private cloud computing environment may comprise one or more on-premise data centers.

The private and public cloud computing environments 102 and 104 of the hybrid cloud system 100 include computing and/or storage infrastructures to support a number of virtual computing instances (VCIs) 108A and 108B. As used herein, the term "virtual computing instance" refers to any software entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being VMs, although embodiments of the invention described herein are not limited to VMs.

As shown in FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, memory 116, a network interface 118, and storage 120. The processor 114 can be any type of a processor, such as a central processing unit. The memory 116 is volatile memory used for retrieving programs and processing data. The memory 116 may include, for example, one or more random access memory (RAM) modules. The network interface 118 enables the host 110 to communicate with another device via a communication medium, such as a physical network 122 within the private cloud computing environment 102. The physical network 122 may include physical hubs, physical switches and/or physical routers that interconnect the hosts 110 and other components in the private cloud computing environment 102. The network interface 118 may be one or more network adapters, such as a Network Interface Card (NIC). The storage 120 represents local storage devices (e.g., one or more hard disks, flash memory modules, solid state disks and optical disks) and/or a storage interface that enables the host 110 to communicate with one or more network data storage systems. Example of a storage interface is a host bus adapter (HBA) that couples the host 110 to one or more storage arrays, such as a storage area network (SAN) or a network-attached storage (NAS), as well as other network data storage systems. The storage 120 is used to store information, such as executable instructions, virtual disks, configurations and other data, which can be retrieved by the host 110.

Each host 110 may be configured to provide a virtualization layer that abstracts processor, memory, storage and networking resources of the hardware platform 112 into the virtual computing instances, e.g., the VMs 108A, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host 110 may include other virtualization software platforms to support those processing entities, such as Docker virtualization platform to support software containers. In the illustrated embodiment, the host 110 also includes a virtual network agent 126. The virtual network agent 126 operates with the hypervisor 124 to provide virtual networking capabilities, such as bridging, L3 routing, L2 Switching and firewall capabilities, so that software defined networks or virtual networks can be created. The virtual network agent 126 may be part of a VMware NSX® logical network product installed in the host 110 ("VMware NSX" is a trademark of VMware, Inc.). In a particular implementation, the virtual network agent 126 may be a virtual extensible local area network (VXLAN) endpoint device (VTEP) that operates to execute operations with respect to encapsulation and decapsulation of packets to support a VXLAN backed overlay network.

The private cloud computing environment 102 includes a virtualization manager 128, a software-defined network (SDN) manager 130, an SDN controller 132, and a cloud service manager (CSM) 134 that communicate with the hosts 110 via a management network 136. In an embodiment, these management components are implemented as computer programs that reside and execute in one or more computer systems, such as the hosts 110, or in one or more virtual computing instances, such as the VMs 108A running on the hosts.

The virtualization manager 128 is configured to carry out administrative tasks for the private cloud computing environment 102, including managing the hosts 110, managing the VMs 108A running on the hosts, provisioning new VMs, migrating the VMs from one host to another host, and load balancing between the hosts. One example of the virtualization manager 128 is the VMware vCenter Server® product made available from VMware, Inc.

The SDN manager 130 is configured to provide a graphical user interface (GUI) and REST APIs for creating, configuring, and monitoring SDN components, such as logical switches, and edge services gateways. The SUN manager allows configuration and orchestration of logical network components for logical switching and routing, networking and edge services, and security services and distributed firewall (DFW). In some embodiments, the SDN manager is further configured to provide these functionalities in the public cloud computing environment 104. One example of the SDN manager is the NSX manager of VMware NSX product.

The SDN controller 132 is a distributed state management system that controls virtual networks and overlay transport tunnels. In an embodiment, the SDN controller is deployed as a cluster of highly available virtual appliances that are responsible for the programmatic deployment of virtual networks across the hybrid cloud system 100. The SDN controller is responsible for providing configuration to other SDN components, such as the logical switches, logical routers, and edge devices. One example of the SDN controller is the NSX controller of VMware NSX product.

The CSM 134 is configured to provide a graphical user interface (GUI) and REST APIs for onboarding, configuring, and monitoring an inventory of public cloud constructs, such as VMs in the public cloud computing environment 104. In an embodiment, the CSM is implemented as a virtual appliance running in any computer system. One example of the CSM is the CSM of VMware NSX product.

The private cloud computing environment 102 further includes a network connection appliance 138 and a public network gateway 140. The network connection appliance allows the private cloud computing environment to connect to the public cloud computing environment 104 through the direct connection 107, which may be a VPN, Amazon Web Services® (AWS) Direct Connect or Microsoft® Azure® ExpressRoute connection. The public network gateway allows the private cloud computing environment to connect to the public cloud computing environment through the network 106, which may include the Internet. The public network gateway may manage external public Internet Protocol (IP) addresses for network components in the private cloud computing environment, route traffic incoming to and outgoing from the private cloud computing environment and provide networking services, such as firewalls, network address translation (NAT), and dynamic host configuration protocol (DHCP). In some embodiments, the private cloud computing environment may include only the network connection appliance or the public network gateway.

The public cloud computing environment 104 of the hybrid cloud system 100 is configured to dynamically provide cloud networks 142 in which various virtual compute, virtual network and virtual storage components can be deployed using hardware resources 144. These cloud networks 142 can be provided to various tenants, which may be business enterprises. As an example, the public cloud computing environment may be AWS cloud and the cloud networks may be virtual public clouds (VPCs). As another example, the public cloud computing environment may be Azure cloud and the cloud networks may be virtual networks (VNets).

The hardware resources 144 includes host computers 146, network components 148 and storage 150. The host computers 146 can be any type of physical server-grade computer system. The network components 148 includes common physical networking components commonly found in any network, such as routers and switches. The storage 150 can be any type of a storage system for mass storage, such as a storage area network (SAN).

The cloud network 142 includes a network connection appliance 152, a public network gateway 154, a public cloud gateway 156, a compute resource 158 and a storage resource 160. The network connection appliance 152 is similar to the network connection appliance 138. Thus, the network connection appliance 152 allows the cloud network 142 in the public cloud computing environment 104 to connect to the private cloud computing environment 102 through the direct connection 107, which may be a VPN, AWS Direct Connect or Azure ExpressRoute connection. In a particular implementation, the network connection appliance 152 may be an AWS Direct Connect gateway (referred to herein simply as "Direct Connect gateway"). The public network gateway 154 is similar to the public network gateway 140. The public network gateway 154 allows the cloud network to connect to any other network, such as the private cloud computing environment 102 through the network 106. The public network gateway 154 may manage external public IP addresses for network components in the cloud network, route traffic incoming to and outgoing from the cloud network and provide networking services, such as firewalls, NAT and DHCP. In some embodiments, the cloud network may include only the network connection appliance 152 or the public network gateway 154.

The public cloud gateway 156 of the cloud network 142 is connected to the network connection appliance 152 and the public network gateway 154 to route data traffic from and to the compute resource 158 of the cloud network via the network connection appliance 152 or the public network gateway 154. In particular, the public cloud gateway may allow or deny data traffic based on security groups and/or policy rules for the cloud network 142 in the public cloud computing environment 104.

The compute resource 158 is virtualized compute resource assigned to the cloud network 142. The compute resource is provided by the hardware resources 144 of the public cloud computing environment 104, which may support various virtual computing instances, such as the VMs 108B. If the public cloud computing environment 104 is AWS cloud, the compute resource may be an EC2 instance. If the public cloud computing environment 104 is Azure cloud, the compute resource may include Azure VMs.

The storage resource 160 is virtualized storage resource allocated to the cloud network 142. The storage resource is provided by the hardware resources 144 of the public cloud computing environment 104. If the public cloud computing environment 104 is AWS cloud, the storage resource may include one or more S3 buckets. If the public cloud computing environment 104 is Azure cloud, the storage resource may include Azure Blob storage.

Figure 2:
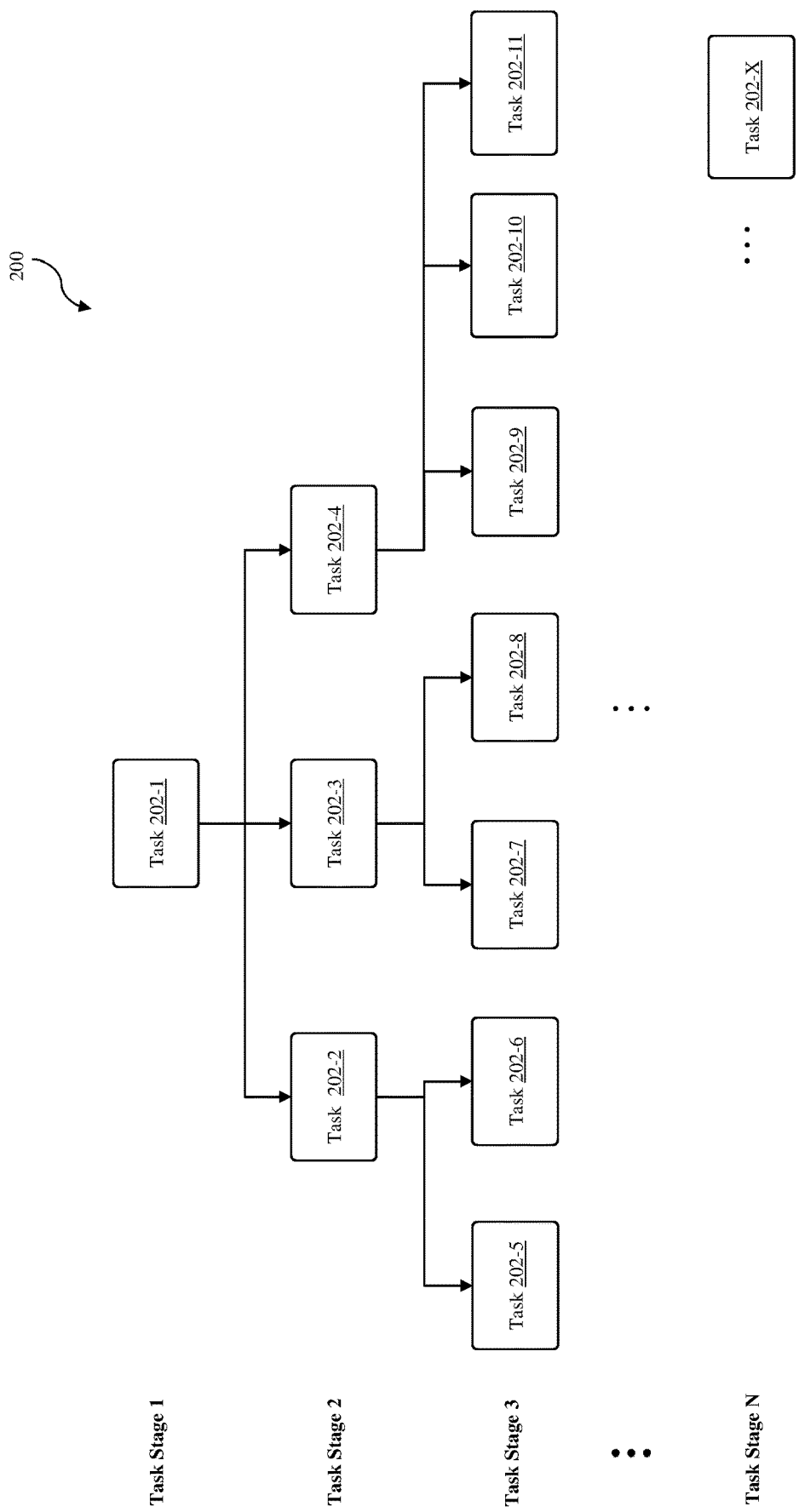
FIG. 2 illustrates an example of a multi-stage distributed computing operation.

The compute resources of the private and/or public cloud computing environments 102 and 104, e.g., the VMs 108A and 108B, may be used to support service compute nodes, which may be microservices or serverless functions, that can execute distributed computing operations. Service compute nodes are separate computer programs, which may include one or more processing routines to execute various operations to complete the requested tasks. Some distributed computing operations may include a series of multiple task stages, where one stage must be completed before another stage can be executed. An example of a multi-stage distributed computing operation is illustrated in FIG. 2. The multi-stage distributed computing operation 200 includes sequential task stages that begins with task stage 1 and ends with task stage N, where N can be any positive integer. These task stages include tasks 202-1 thru 202-X, where X is another positive integer, which are executed by a number of service compute nodes (not illustrated).

In this example, for the task stage 1, the task 202-1 is executed by a service compute node. Next, for the task stage 2, each of the tasks 202-2, 202-3 and 202-4 is executed by a service compute node. Each of these tasks requires the completion of the task 202-1 at the task stage 1. Next, for the task stage 3, each of the tasks 202-5 to 202-11 performs a task. In this stage, each of the tasks 202-5 and 202-6 requires the completion of the task 202-2 at the task stage 2. In addition, each of the tasks 202-7 and 202-8 requires the completion of the task 202-3 at the task stage 2. Lastly, each of the tasks 202-9, 202-10 and 202-11 requires the completion of the task 202-4 at the task stage 2. Subsequent task stages may include similar tasks that require completion of tasks from previous task stages. The multi-stage distributed computing operation ends after the completion of the task stage N by a service compute node.

The responsibility of executing the task stages is divided among the participant service compute nodes (sometimes referred to herein simply as "compute nodes"), which may be fewer than the tasks performed for the entire multi-stage distributed computing operation. That is, some of the participant compute nodes may perform multiple tasks during different task stages. In a conventional system, when a participant compute node is finished executing a task for a task stage, it enqueues a message in a message broker, such as a Kafka or RabbitMQ broker, with information about the next task of the current or subsequent task stage to be executed. This process continues until the task reach the terminal task stage. However, when a task has failed at any compute node during the execution of the distributed computing operation, a rollback process is executed to roll back any tasks that were performed by that computing node, which includes a cleanup operation for any objects created by the computing node during the execution of the current failed task, as well as any objects created during the execution of the previous tasks. In addition, other compute nodes may need to perform similar rollback processes for the tasks performed by those compute nodes during the execution of the distributed computing operation.

Following is an example of pseudo-code that can be executed by each compute node.

```
// receive a message from broker and get the message type
If (taskType == A) {
    //execute task for task A and store the result in task A record in DB
    // mark the task as completed or failed based on task result
    // set the task type to B and enqueue the message
    if (taskA has failed) {
        cleanUpObjectsCreatedByTaskA( );
} else if (taskType == B) {
    //execute task for task B and store the result in task B record in DB
    // mark the task as completed or failed based on task result
    // set the task type to C and enqueue the message
    if (taskB has failed) {
        cleanUpObjectsCreatedByTaskA( );
        cleanUpObjectsCreatedByTaskB( );
} else if (taskType == C) {
    //execute task for task C and store the result in task C record in DB
    // set the task type to D and enqueue the message
    if (taskC has failed) {
        cleanUpObjectsCreatedByTaskA( );
        cleanUpObjectsCreatedByTaskB( );
        cleanUpObjectsCreatedByTaskC( );
    }
} else if (taskType == D) {
    //execute task for task C and store the result in task C record in DB
    if (taskD has failed) {
        cleanUpObjectsCreatedByTaskA( );
        cleanUpObjectsCreatedByTaskB( );
        cleanUpObjectsCreatedByTaskC( );
        cleanUpObjectsCreatedByTaskD( );
    }
}
...
```

The approach using the above pseudo-code have the following downsides:

1) The code is difficult to maintain as each stage needs to roll back the previous stage operation. If a new stage is introduced, then that stage needs to have logic to roll back any previous stage configuration and also any subsequent stages need to be first rolled back to roll back the operation of this stage.
2) It is difficult to parallelize the rollback operation because of the serial nature of the rollback operation for each compute node.

As the above example illustrates, each stage needs to have the knowledge of the previous stages to roll back the entire state machine execution. Thus, such approach is not easily maintainable and scalable.

Figure 3:
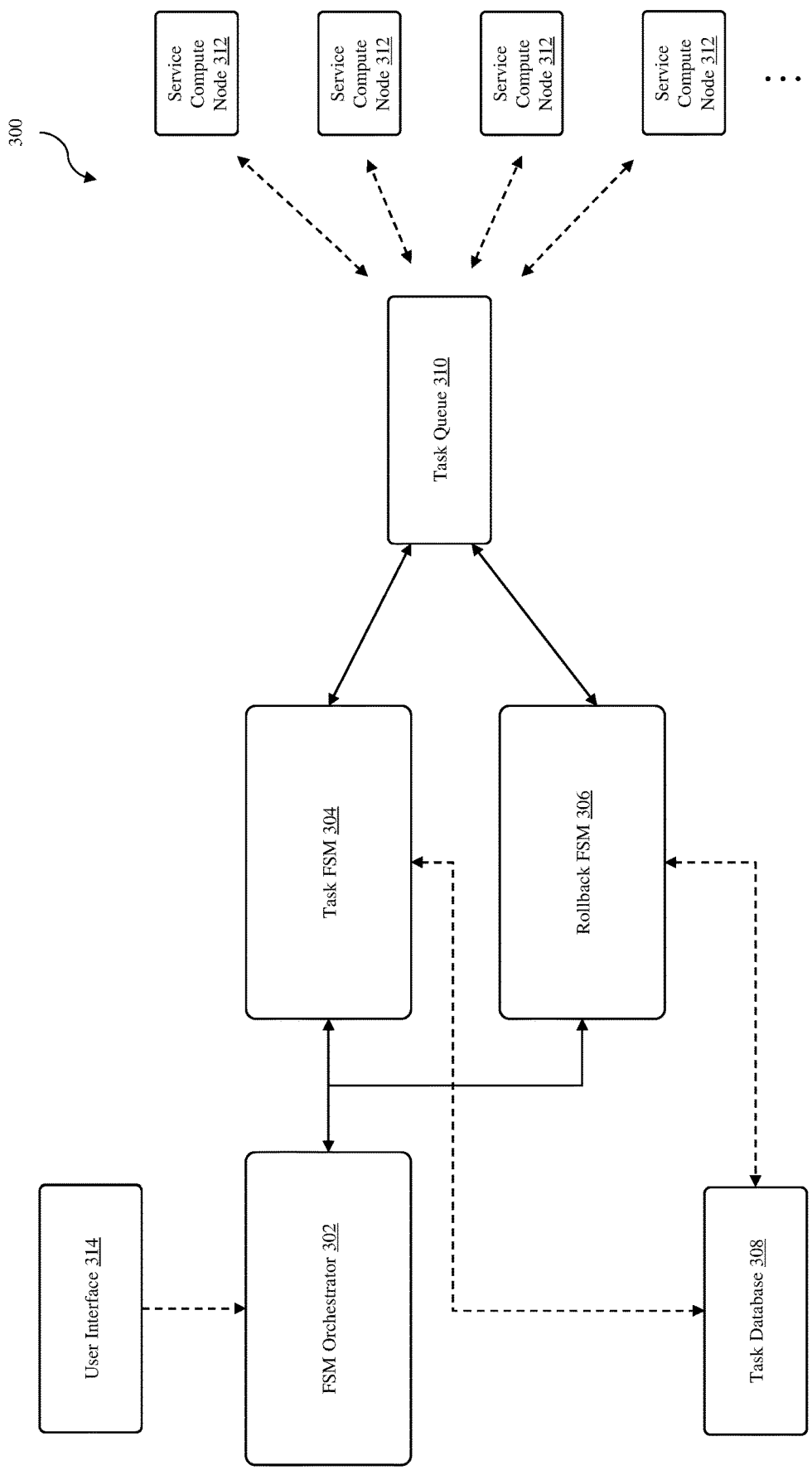
FIG. 3 is a block diagram of an operation execution system, which may be implemented in the hybrid cloud system of FIG. 1, in accordance with an embodiment of the invention.

Turning now to FIG. 3, an operation execution system 300 in accordance with an embodiment of the invention is shown. The operation execution system 300 may be implemented in the hybrid cloud system 100. As shown in FIG. 3, the operation execution system includes a finite state machine (FSM) orchestrator 302, a task FSM 304, a rollback FSM 306, a task database 308, a task queue 310 and a number of service compute nodes 312. In an embodiment, these components of the operation execution system may be implemented as software running on various compute resources in the hybrid cloud system 100, which may be physical or virtual compute resources, such as virtual machines.

The FSM orchestrator 302 is configured to manage the execution of distributed computing operations, including multi-stage distributed computing operations, and to manage the execution of rollback operations. One of the responsibilities of the FSM orchestrator 302 is to start the task FSM 304 in response to a request to execute a distributed computing operation, such as creating a cloud infrastructure in a public cloud, e.g., a cloud network 142 in the public cloud computing environment 104, which may be from a user interface 314 running on any computer system. Another responsibility of the FSM orchestrator 302 is to monitor the progress of each task of a distributed computing operation to detect any failures during the execution. A related responsibility of the FSM orchestrator 302 is to start the rollback FSM 306 when a failure is detected during the execution of a distributed computing operation. As an example, a failure may be detected when informed by one or more of the service compute nodes 312 that are performing tasks for the distributed computing operation or when a timeout occurs for the execution of a particular task of the distributed computing operation.

The task FSM 304 is configured to execute an operation workflow for a distributed computing operation using the service compute nodes 312 when initiated by the FSM orchestrator 302. Individual tasks of the operations workflow are performed by the participant service compute nodes 312, which may not be all the service compute nodes 312. These tasks may be distributed among the participant service compute nodes 312 using a task message published in the task queue 310. The task message in the task queue 310 allows one of the participant service compute nodes 312 to handle the execution of a task specified in the task message. If the task involves creating a software object, information regarding that object, such as an identification (ID) of the object created, may be stored in the task database 308 and be associated with a main ID of the distributed computing operation, which can be used to retrieve the information of the object. The information of the object can be stored in the task database 308 in any format or structure, such as JavaScript Object Notation (JSON) format.

In an embodiment, when a task specified in the task message has been completed by a participant service compute node, the task message is modified to specify the next task that needs to be executed. The modified task message is then enqueued back in the task queue 310 so that another participant service compute node can execute the next task specified in the task message. In this manner, all the tasks of an operation workflow for a distributed computing operation can be executed as needed, which may involve sequential execution of at least some of the tasks. When the last task has been completed, the task message is modified to specify that all the tasks for the operation workflow have been completed.

The rollback FSM 306 is configured to execute a rollback workflow for a distributed computing operation using the participant service compute nodes 312 when initiated by the FSM orchestrator 302. Similar to the operation workflow, individual tasks of the rollback workflow are performed by the participant service compute nodes 312. Each of these rollback tasks corresponds to a particular task of the operation workflow to try to roll back the execution of that corresponding operation workflow task. The rollback workflow for a distributed computing operation is an independent workflow with respect to the operation workflow for the distributed computing operation. That is, the tasks of the rollback workflow are not part of the operation workflow and vice versa. The rollback tasks may be distributed among the participant service compute nodes 312 using a rollback message published in the task queue 310 or in another queue. The rollback message in the task queue 310 allows one of the participant service compute nodes 312 to execute a task specified in the rollback message, e.g., in the same manner as the described above with respect to the task message used in the operation workflow.

The use of the operation and rollback workflows, which are independent from each other, allows the operation execution system 300 to be easily maintainable and scalable. In addition, the operation execution system 300 can be configured to execute any stage of a multi-stage distributed computing operation in parallel, if needed.

Figure 4:
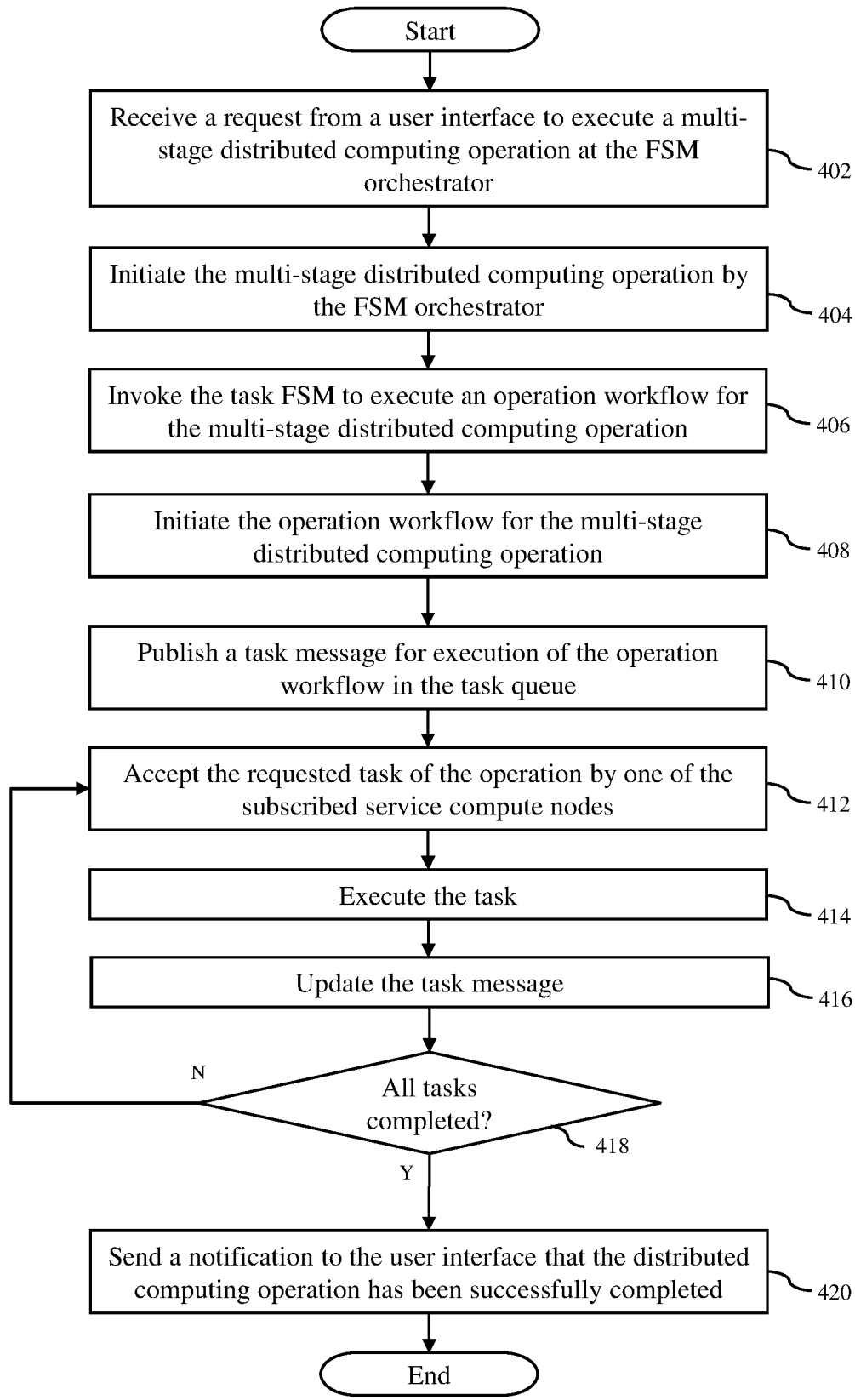
FIG. 4 is a process flow diagram of an execution process for a multi-stage distributed computing operation executed by the operation execution system of FIG. 3 in accordance with an embodiment of the invention.

An execution process for a multi-stage distributed computing operation executed by the operation execution system 300 in accordance with an embodiment of the invention is described with reference to a process flow diagram of FIG. 4. The operation begins at step 402, where a request from a user interface, e.g., the user interface 314, to execute the multi-stage distributed computing operation is received at the FSM orchestrator 302. As an example, the request may be a request to create a cloud network 142 in the public cloud computing environment 104 that comprises a VPC with an EC2 instance, an S3 bucket and a Direct Connect gateway. The request may include an ID or name of the operation type requested, e.g., creation of a cloud network, an ID of the request source, e.g., the user interface, and an ID of the request. These IDs may be a unique string of alphanumeric characters with or without symbols.

Next, at step 404, the multi-stage distributed computing operation is initiated by the FSM orchestrator 302 in response to the received request. As part of this process, the FSM orchestrator 302 may parse the request to extract information regarding the distributed computing operation being requested.

Next, at step 406, the task FSM 304 is invoked by the FSM orchestrator 302 to execute an operation workflow for the multi-stage distributed computing operation. As part of this step, instructions may be transmitted from the FSM orchestrator 302 to the task FSM 304 to execute the operation workflow. The instructions may include the requested operation and an ID of the requested operation, which may be the ID of the request that can be used to distinguish this particular operation from other operations that have been or will be requested. For the cloud network creation example, the operation workflow may include a chain of tasks, which includes a first task to create a VPC, a second task to create an EC2 instance, a third task to create an S3 bucket and a fourth task to create a Direct Connect gateway.

Next, at step 408, the operation workflow is initiated by the task FSM 304 for the multi-stage distributed computing operation. As part of this step, information for the multi-stage distributed computing operation may be processed to create a task message, which is used to distribute tasks to the service compute nodes 312. In an embodiment, the task message may include the ID of the requested operation and at least a task type field, which includes one of the tasks of the operation workflow that needs to be executed or information that all the tasks of the operation workflow for the multi-stage distributed computing operation have been completed. Thus, the task type field of the task message indicates whether or not the operation workflow has been completed and, if not, the task that needs to be executed next for the operation workflow.

Next, at step 410, the task message for execution of the operation workflow is published by the task FSM 304 in the task queue 310 for the subscribed or participant service compute nodes 312 of the operation execution system 300. In an embodiment, the task type field of the task message includes the first task in the operation workflow that needs to be executed. For the cloud network creation example, this first task would be a task to create a VPC. As described below, when the task has been completed, the task type field is updated with the next task in the operation workflow that needs to be executed. When the last task has been completed, the task type field is updated to indicate that all the tasks in the operation workflow have been completed. For the cloud network creation example, the task type field would be updated in the following order: (1) a task to create a VPC, (2) a task to create an EC2 instance, (3) a task to create an S3 bucket, (4) a task to create a direct connect gateway and (5) an indication that all the tasks of the operation workflow have been completed. In an embodiment, the subscribed service compute nodes 312 may be alerted of the task message so that one of the subscribed service compute nodes can accept and execute the task specified in the task message.

Next, at step 412, the task of the operation in the task message is accepted by one of the subscribed service compute nodes 312 in response to the enqueued task message. As part of this step, the subscribed service compute node that has accepted the task may dequeue the task message so that no other service compute node will handle the task indicated in the task message. The subscribed service compute node that has accepted the task of the operation in the task message will be referred to herein as the "handling compute node". Alternatively, the subscribed service compute node that has accepted the task may change a status of the task message to indicate that the task is being handled, which will inform the other subscribed service compute nodes that the task is being handled by that subscribed service compute node.

Next, at step 414, the task of the operation in the task message is executed by the handling compute node 312. In an embodiment, as part of executing the task, one or more software objects or entities may be created and configured. In addition, information regarding these objects or entities, such as IDs of these objects or entities, is stored in the task database 308 and associated with the ID of the requested operation. For the cloud network creation example, the task may involve creating a VPC, an EC2 instance, an S3 bucket or a Direct Connect gateway and storing ID of the created object in the task database 308.

Next, at step 416, after the task has been successfully executed, the task message is updated by the handling compute node 312 to reflect the successful completion of the task. In an embodiment, the task message is updated by changing the task type field to either the next task to be completed or an indication that all the tasks of the operation workflow have been completed.

Next, at step 418, a determination is made by the FSM orchestrator 302 whether all the tasks of the operation workflow have been completed, which is indicated in the task type field. In an embodiment, when the task type field is updated to "FINISHED" status, all the tasks of the operation workflow can be considered to have been successfully executed. If the task type field indicates that the all the tasks of the operation workflow have been completed, then the process proceeds to step 420. However, if the task type field indicates that another task needs to be executed, the process proceeds back to step 412, where one of the subscribed service compute nodes 312 accepts the current task indicated in the task message to execute that task. Thus, steps 412 to 418 will be repeated until all the tasks in the operation workflow have been successfully executed.

Next, at step 420, a notification is sent to the user interface 314 from the FSM orchestrator 302 that the distributed computing operation has been successfully completed. The process then comes to an end.

During the process of executing the multi-stage distributed computing operation, each of the tasks for the operation workflow is monitored by the FSM orchestrator 302 to detect any failure. A failure may occur due to one or more hardware and/or software failures during the execution of a task for the distributed computing operation. When a failure is detected, a rollback process is initiated by the FSM orchestrator 302, as described below.

Figure 5:
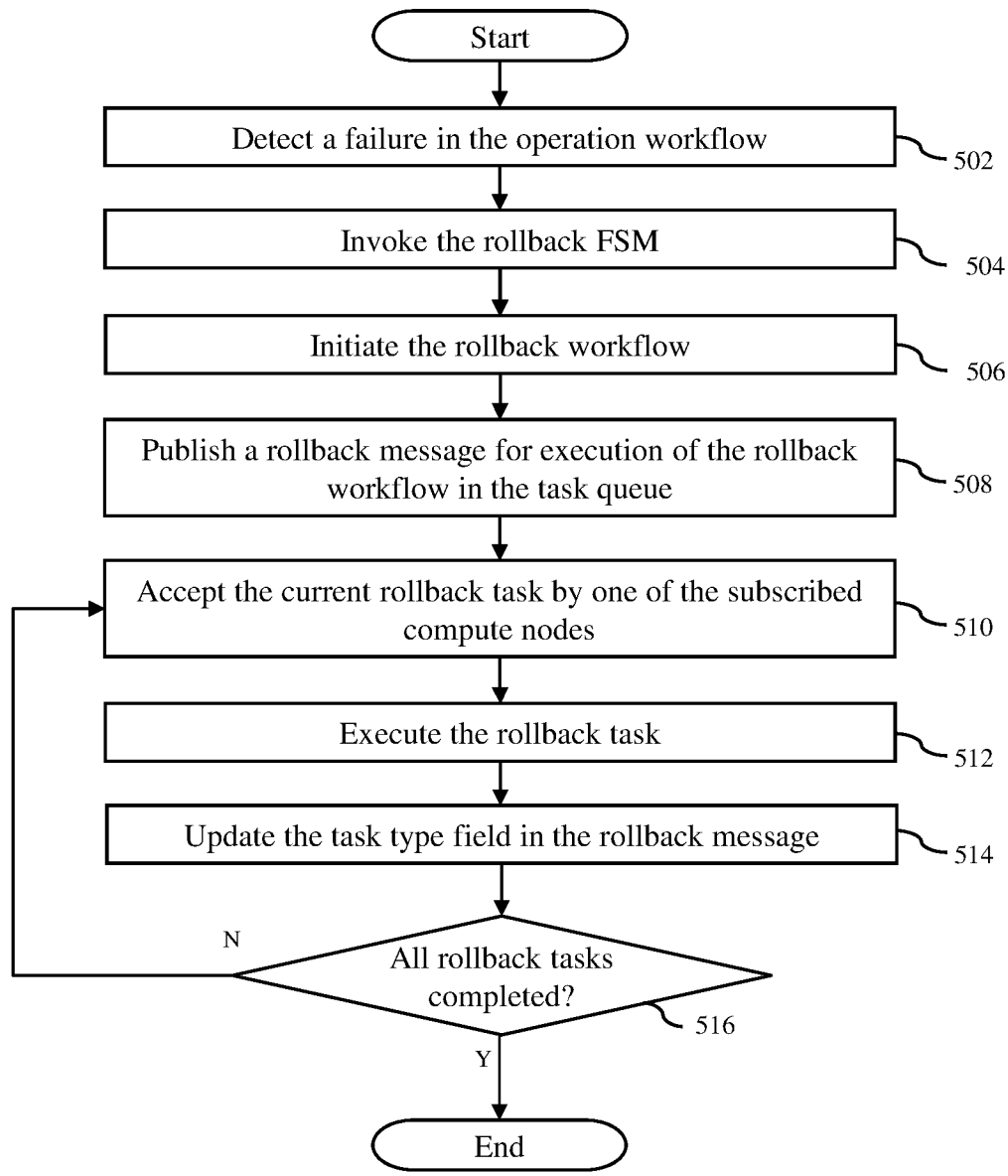
FIG. 5 is a process flow diagram of a rollback process for a multi-stage distributed computing operation executed by the operation execution system of FIG. 3 in accordance with an embodiment of the invention.

A rollback process for a multi-stage distributed computing operation executed by the operation execution system 300 in accordance with an embodiment of the invention is described with reference to a process flow diagram of FIG. 5. The rollback process begins at step 502, where a failure during one of the tasks in the operation workflow for the multi-stage distributed computing operation is detected by the FSM orchestrator 302.

Next, at step 504, the rollback FSM 306 is invoked by the FSM orchestrator 302 in response to the failure detection to execute a rollback workflow for the failed multi-stage distributed computing operation. As part of this step, instructions may be transmitted from the FSM orchestrator 302 to the rollback FSM 306 to execute the rollback workflow. The instructions may include at least the ID of the failed multi-stage distributed computing operation. For the cloud network creation example, the rollback workflow may include a chain of rollback tasks, which includes a first rollback task to roll back the VPC creation, a second rollback task to roll back the EC2 instance creation, a third task to roll back the S3 bucket creation and a fourth task to roll back the Direct Connect gateway creation.

Next, at step 506, the rollback workflow is initiated by the rollback FSM 306 for the failed multi-stage distributed computing operation. As part of this step, information regarding the failed operation workflow for the multi-stage distributed computing operation may be processed to create a rollback message, which is used to distribute rollback tasks to the service compute nodes 312. In an embodiment, the rollback message may include the ID of the failed multi-stage distributed computing operation and at least a task type field, which includes one of the rollback tasks of the rollback workflow that needs to be executed or information that all the rollback tasks of the rollback workflow for the multi-stage distributed computing operation have been completed. Thus, the task type field of the rollback message indicates whether or not the rollback workflow has been completed and, if not, the rollback task that needs to be executed next for the rollback workflow.

Next, at step 508, the rollback message for execution of the rollback workflow is published in the task queue 310 by the rollback FSM 306 for the subscribed compute nodes 312 of the operation execution system. In an embodiment, the task type field of the rollback message includes the first rollback task in the rollback workflow that needs to be executed. For the cloud network creation example, the first rollback task would be the task to roll back the VPC creation. Similar to the operation workflow, when the current task has been completed, the task type field is updated with the next task in the rollback workflow that needs to be executed. When the last rollback task has been completed, the task type field is updated to indicate that all the rollback task in the rollback workflow have been completed. For the cloud network creation example, the task type field of the rollback message would be updated in the following order: (1) a first rollback task to roll back the VPC creation, (2) a second rollback task to roll back the EC2 creation, (3) a third rollback task to roll back the S3 bucket creation, (4) a fourth rollback task to roll back the Direct Connect gateway creation, and (5) an indication that all the rollback tasks of the rollback workflow have been completed. In an embodiment, the subscribed compute nodes may be alerted of the message so that one of the subscribed compute nodes can accept and execute the current rollback task identified in the rollback message.

Next, at step 510, the current rollback task in the rollback message is accepted by one of the subscribed compute nodes 312 in response to the published rollback message. As part of this step, the subscribed service compute node that has accepted the rollback task may dequeue the rollback message so that no other service compute node will handle the rollback task indicated in the rollback message. Alternatively, the subscribed service compute node that has accepted the rollback task may change a status of the rollback message to indicate that the rollback task is being handled, which will inform the other subscribed service compute nodes that the rollback task is being handled by that subscribed service compute node.

Next, at step 512, the current rollback task is executed by the handling compute node 312. In an embodiment, as part of executing the rollback task, information regarding one or more software objects or entities that have been created during the associated task of the operation workflow of the multi-stage distributed computing operation is retrieved from the task database 308 using the ID of the failed multi-stage distributed computing operation. That is, the ID of the failed multi-stage distributed computing operation is used to query the task database to retrieve IDs, configuration data or other information regarding the software objects or entities that have been created during the associated task of the operation workflow of the multi-stage distributed computing operation. Thus, these software objects or entities can be deleted using the retrieved information. For the cloud network creation example, the rollback task may involve deleting the VPC, the EC2 instance, the S3 bucket or the Direct Connect gateway. However, if the information regarding one or more software objects or entities that have been created during the associated task of the operation workflow of the multi-stage distributed computing operation cannot be found, the process proceeds to step 514 without taking any action, e.g., without executing any deletions of software objects or entities.

Next, at step 514, after the rollback task has been successfully executed, the rollback message is updated by the handling compute node 312 to reflect the successful completion of the rollback task. In an embodiment, the rollback message is updated by changing the task type field in the rollback message to either the next rollback task to be completed or an indication that all the rollback tasks of the rollback operation workflow have been completed (after the last rollback task has been successfully executed).

Next, at step 516, a determination is made by the FSM orchestrator 302 whether all the rollback tasks of the rollback workflow have been completed, which is indicated by the task type field of the rollback message. In an embodiment, when the task type field of the rollback message is updated to "FINISHED", all the rollback tasks of the rollback workflow can be considered to have been successfully executed. If the task type field of the rollback message indicates that all the rollback tasks of the rollback workflow have been completed, then the process comes to an end. However, if the current task status indicates that another rollback task needs to be executed, the process proceeds back to step 510, where one of the subscribed compute nodes 312 accepts the current rollback task indicated in the task message to execute the rollback task. Thus, steps 510 to 516 are repeated until all the rollback tasks in the rollback workflow have been successfully executed.

Thus, the rollback process is similar to the execution process. However, the rollback process works on the data retrieved from the task database 308. As described above, if the data for a particular rollback task is not present in the task database 308, no action will be taken for that particular rollback task and the rollback process moves to the next rollback task. Thus, the approach of using the described execution and rollback processes is easier to maintain and scale than conventional approaches.

Figure 6A:
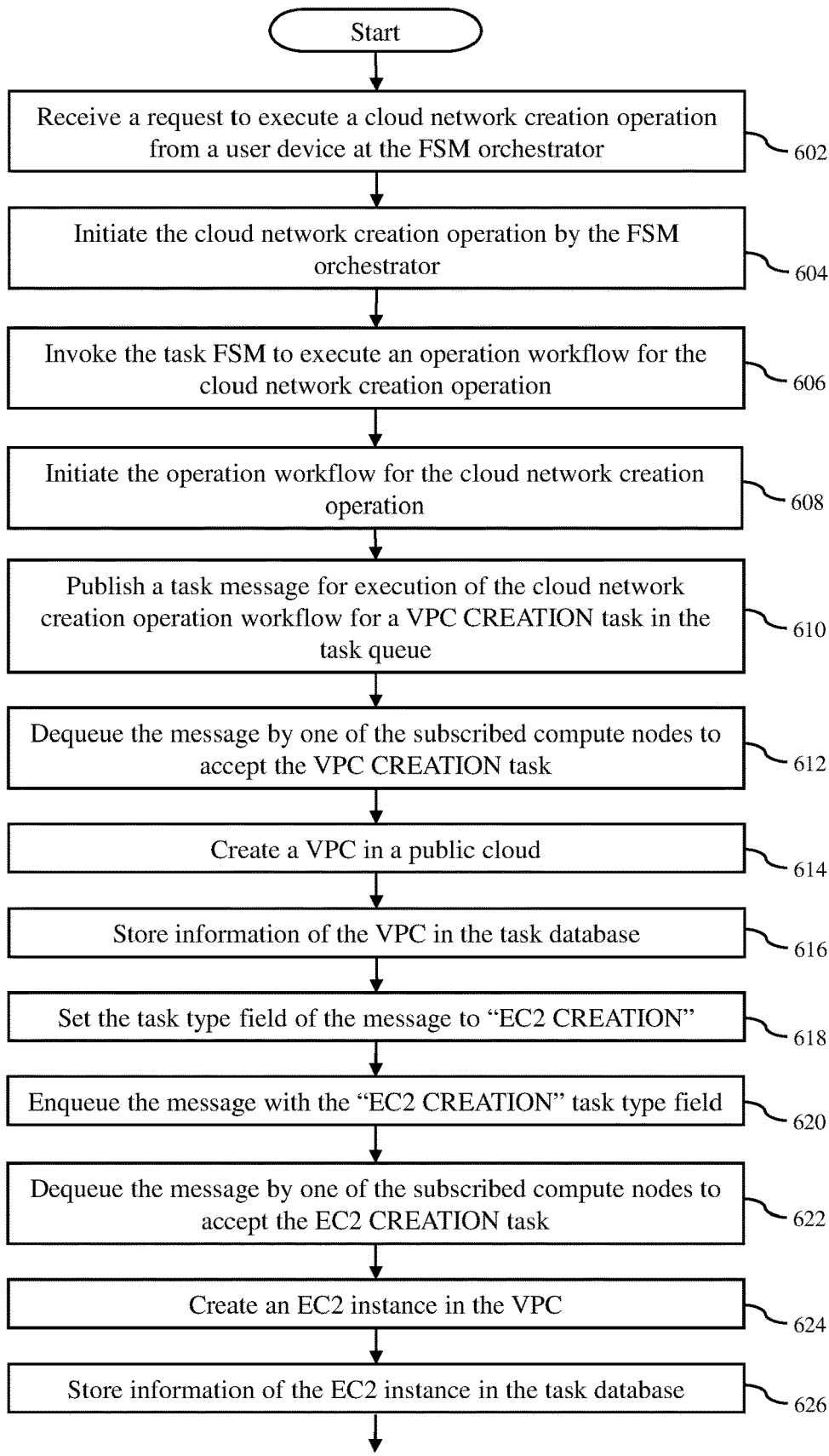
FIGS. 6A and 6B is a process flow diagram of an execution process for a multi-stage distributed computing operation for creating a cloud network in a public cloud computing environment executed by the operation execution system of FIG. 3 in accordance with an embodiment of the invention.
Figure 6B:
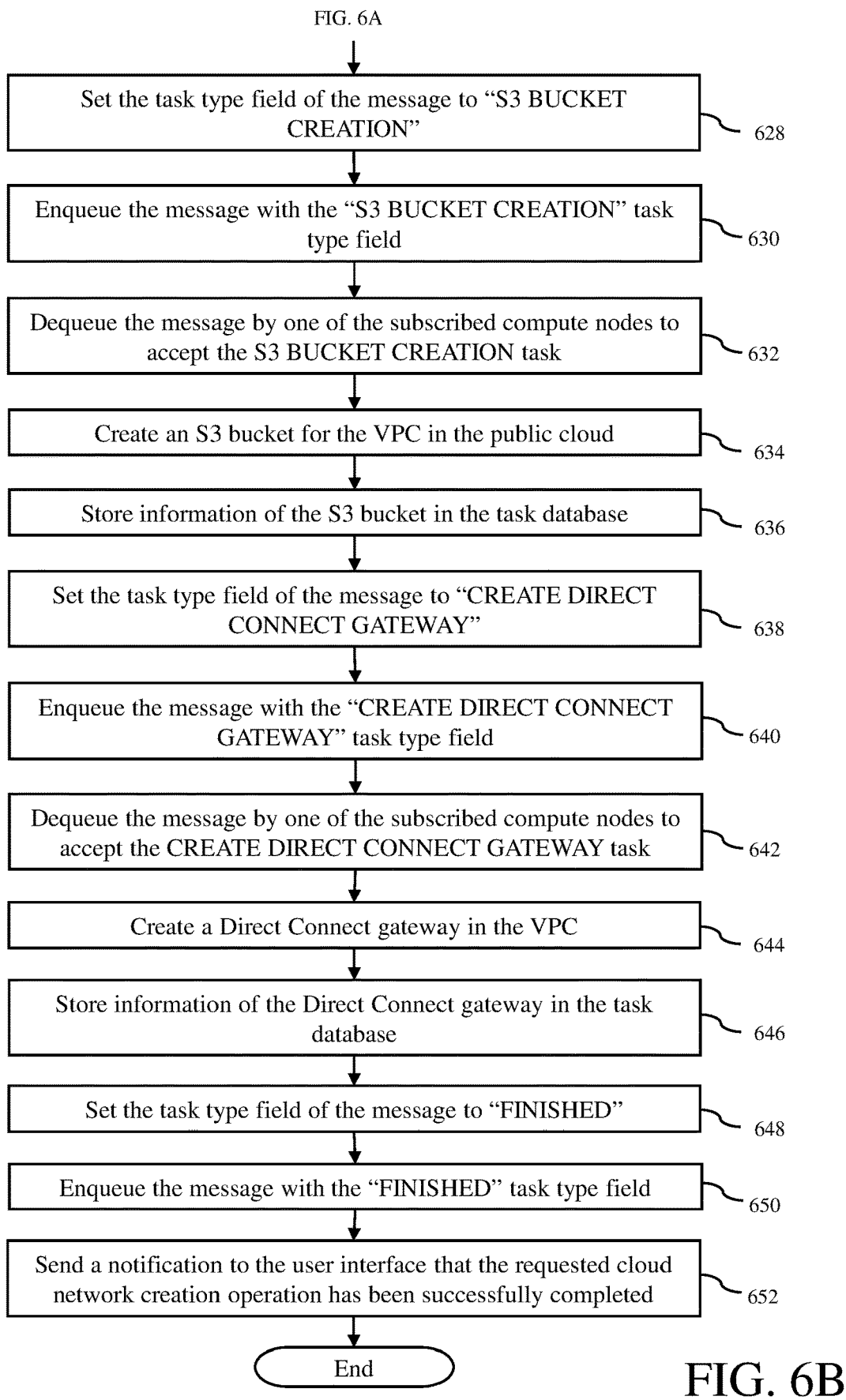

The execution and rollback processes for multi-stage distributed computing operations by the operation execution system 300 will be further described in detail using the example of a multi-stage distributed computing operation for creating a cloud network in the public cloud computing environment 104 in accordance with an embodiment of the invention. The process of executing a multi-stage distributed computing operation for creating a cloud network in the public cloud computing environment 104, e.g., AWS public cloud, in accordance with an embodiment of the invention is described with reference to a process flow diagram of FIGS. 6A and 6B. The operation begins at step 602, where a request from a user interface, e.g., the user interface 314, to execute a cloud network creation operation is received at the FSM orchestrator 302. The request may include the name of the requested operation, e.g., "cloud network creation", an ID of the request source, e.g., the user interface 314, and an ID of the request. These IDs may be a unique string of alphanumeric characters with or without symbols.

Next, at step 604, the cloud network creation operation is initiated by the FSM orchestrator 302 in response to the received request. As part of this process, the FSM orchestrator 302 may parse the request to extract information regarding the multi-stage distributed computing operation being requested. Since the request was for a cloud network creation operation, the information extracted relates to information regarding a cloud network creation, such as virtual compute and storage resources required for the cloud network to be created.

Next, at step 606, the task FSM 304 is invoked by the FSM orchestrator 302 to execute an operation workflow for the cloud network creation operation. As part of this step, instructions may be transmitted from the FSM orchestrator 302 to the task FSM 304 to execute the operation workflow. The instructions may include the name of the requested operation, i.e., the cloud network creation operation, and an ID of the requested operation, which may be the ID of the request that can be used to distinguish this particular operation from other operations that have been or will be requested.

Next, at step 608, the operation workflow is initiated by the task FSM 304 for the cloud network creation operation. As part of this step, information for the cloud network creation operation may be processed to create a task message, which is used to distribute tasks to the service compute nodes 312. In an embodiment, the task message may include the ID of the requested cloud network creation operation and at least a task type field, which includes one of the tasks of the operation workflow that needs to be executed or information that all the tasks of the operation workflow for the cloud network creation operation have been completed.

Next, at step 610, the task message for execution of the operation workflow is published or enqueued by the task FSM 304 in the task queue 310 for the subscribed service compute nodes 312 of the operation execution system 300. In an embodiment, the task type field of the task message is initially set to "VPC CREATION", which indicates that the task to be executed first is the creation of a VPC in a public cloud, e.g., AWS public cloud.

Next, at step 612, the message with the VPC CREATION task type field is dequeued from the task queue 310 by one of the subscribed service compute nodes 312 in response to the published message to accept and handle the VPC CREATION task. The subscribed compute node that has accepted the task will be referred to herein as the "handling compute node".

Next, at step 614, a VPC is created in a public cloud, such as AWS cloud, by the handling compute node 312 that has accepted the VPC CREATION task. In an embodiment, the creation of a VPC may involve communicating with AWS cloud to provide various information for the VPC, such as name and Classless Inter-Domain Routing (CIDR) block address. The VPC creation will result in various information regarding the newly created VPC, such as an ID of the VPC.

Next, at step 616, after the VPC has been created, the VPC information of the newly created VPC, including the ID of the VPC, is stored in the task database 308 by the handling compute node 312. As described below, the VPC ID can be used to identify this particular VPC that has been created so that this particular VPC can be selected at a later to be deleted or removed during a rollback operation. In an embodiment, the VPC ID is associated with the ID of the cloud network creation operation so that the VPC ID can be found using the ID of the cloud network creation operation.

Next, at step 618, the task type field of the task message is set to a "EC2 CREATION" task, which is the second task of the cloud infrastructure creation operation workflow, by the handling compute node 312. Thus, the task type field of the task message is changed from "VPC CREATION" to "EC2 CREATION".

Next, at step 620, the task message is enqueued back in the task queue 310 by the handling compute node 312 so that the next task, i.e., the "EC2 CREATION" task, can be handled by another compute node 312.

Next, at step 622, the task message with the EC2 CREATION task type field is dequeued from the task queue 310 by one of the subscribed compute nodes 312 to accept and handle the EC2 CREATION task.

Next, at step 624, an EC2 instance is created in the VPC by the handling compute node 312 that has accepted the EC2 CREATION task. In an embodiment, the creation of an EC2 instance may involve communicating with AWS cloud to select various configurations and/or settings for the EC2 instance. The EC2 instance creation will result in various information regarding the newly created EC2 instance, such as an ID of the EC2 instance.

Next, at step 626, after the EC2 instance has been created, the information of the newly created EC2 instance, including the ID of the EC2 instance, is stored in the task database 308 by the handling compute node 312. As described below, the EC2 ID can be used to identify this particular EC2 instance that has been created so that this particular EC2 instance can be selected at a later to be deleted or removed during a rollback operation. In an embodiment, the EC2 ID is associated with the ID of the cloud network creation operation Next, at step 628, the task type field of the message is set to a "S3 BUCKET CREATION" task, which is the third task of the cloud network creation operation workflow, by the handling compute node 312. Thus, the task type field of the task message is changed from "EC2 CREATION" to "S3 BUCKET CREATION".

Next, at step 630, the message is enqueued back in the task queue 310 by the handling compute node 312 so that the next task, i.e., the "S3 BUCKET CREATION" task, can be handled by another compute node 312.

Next, at step 632, the task message with the S3 BUCKET CREATION task type field is dequeued from the task queue 310 by one of the subscribed compute nodes 312 to accept and handle the S3 BUCKET CREATION task.

Next, at step 634, an S3 bucket is created in the public cloud, e.g., AWS cloud, for the VPC by the handling compute node 312 that has accepted the S3 BUCKET CREATION task. In an embodiment, the creation of an S3 bucket may involve communicating with AWS cloud to select various configurations and/or settings for the S3 bucket. The S3 bucket creation will result in various information regarding the newly created S3 bucket, such as an ID of the S3 bucket.

Next, at step 636, after the S3 bucket has been created, information of the newly created S3 bucket, including the ID of the S3 bucket, is stored in the task database 308. As described below, the S3 bucket ID can be used to identify this particular S3 bucket that has been created so that this particular S3 bucket can be selected at a later to be deleted or removed during a rollback operation. In an embodiment, the S3 bucket ID is associated with the ID of the cloud network creation operation Next, at step 638, the task type field of the task message is set to a "CREATE DIRECT CONNECT GATEWAY" task, which is the fourth task of the cloud network creation operation workflow. Thus, the task type field of the task message is changed from "S3 BUCKET CREATION" to "CREATE DIRECT CONNECT GATEWAY".

Next, at step 640, the task message is enqueued back in the task queue 310 by the handling compute node 312 so that the next task, i.e., the "CREATE DIRECT CONNECT GATEWAY" task, can be handled by another compute node 312.

Next, at step 642, the message with the CREATE DIRECT CONNECT GATEWAY task type field is dequeued by one of the subscribed compute nodes 312 to accept and handle the CREATE DIRECT CONNECT GATEWAY task.

Next, at step 644, a Direct Connect gateway is created in the VPC by the handling compute node 312 that has accepted the CREATE DIRECT CONNECT GATEWAY task. In an embodiment, the creation of a Direct Connect gateway may involve communicating with AWS cloud to select various configurations and/or settings for the Direct Connect gateway. The Direct Connect gateway creation will result in various information regarding the newly created Direct Connect gateway, such as an ID of the Direct Connect gateway.

Next, at step 646, after the Direct Connect gateway has been created, information of the newly created Direct Connect gateway, including the ID of the Direct Connect gateway, is stored in the task database 308. As described below, this Direct Connect gateway ID can be used to identify this particular Direct Connect gateway that has been created so that this particular Direct Connect gateway can be selected at a later to be deleted or removed during a rollback operation. In an embodiment, the Direct Connect gateway ID is associated with the ID of the cloud network creation operation Next, at step 648, the task type field of the task message is set to "FINISHED", which indicates that all the tasks for the cloud network creation operation workflow have been completed. Thus, the task type field of the task message is changed from "CREATE DIRECT CONNECT GATEWAY" to "FINISHED".

Next, at step 650, the task message is enqueued back in the task queue 310 by the handling compute node 312 so that the FSM orchestrator 302 and the task FSM 304 will know that all the tasks for the cloud network creation operation workflow have been completed.

Next, at step 652, a notification is sent to the requesting user interface from the FSM orchestrator 302 or the task FSM 304 that the requested cloud network creation operation has been successfully completed. The process then comes to an end.

Below is an example of a pseudo code that can be executed by a handling compute node for the cloud network creation operation.

```
if (taskType == 'VPC_CREATION') {
    // create VPC in AWS
    // store vpc id in DB
    setTaskType(EC2_CREATION)
    // enqueue message
} else if (taskType == 'EC2_CREATION') {
    // create EC2
    // store ec2 id in DB
    setTaskType(S3_BUCKET_CREATION)
    // enqueue message
} else if (taskType == 'S3_BUCKET/CREATION') {
    // create S3 bucket
    // store s3 bucket information in DB
    setTaskType('CREATED_DIRECT_CONNECT_GATEWAY')
    // enqueue message
} else if (taskType == 'CREATED_DIRECT_CONNECT_GATEWAY') {
// create direct connect gateway
// store direct connect information in DB
setTaskType('FINISHED')
// enqueue message
}
```

During the process of executing the multi-stage cloud network creation operation, each of the tasks for the operation workflow is monitored by the FSM orchestrator 302 to detect any failure. When a failure is detected, the following rollback process is initiated by the FSM orchestrator 302.

Figure 7A:
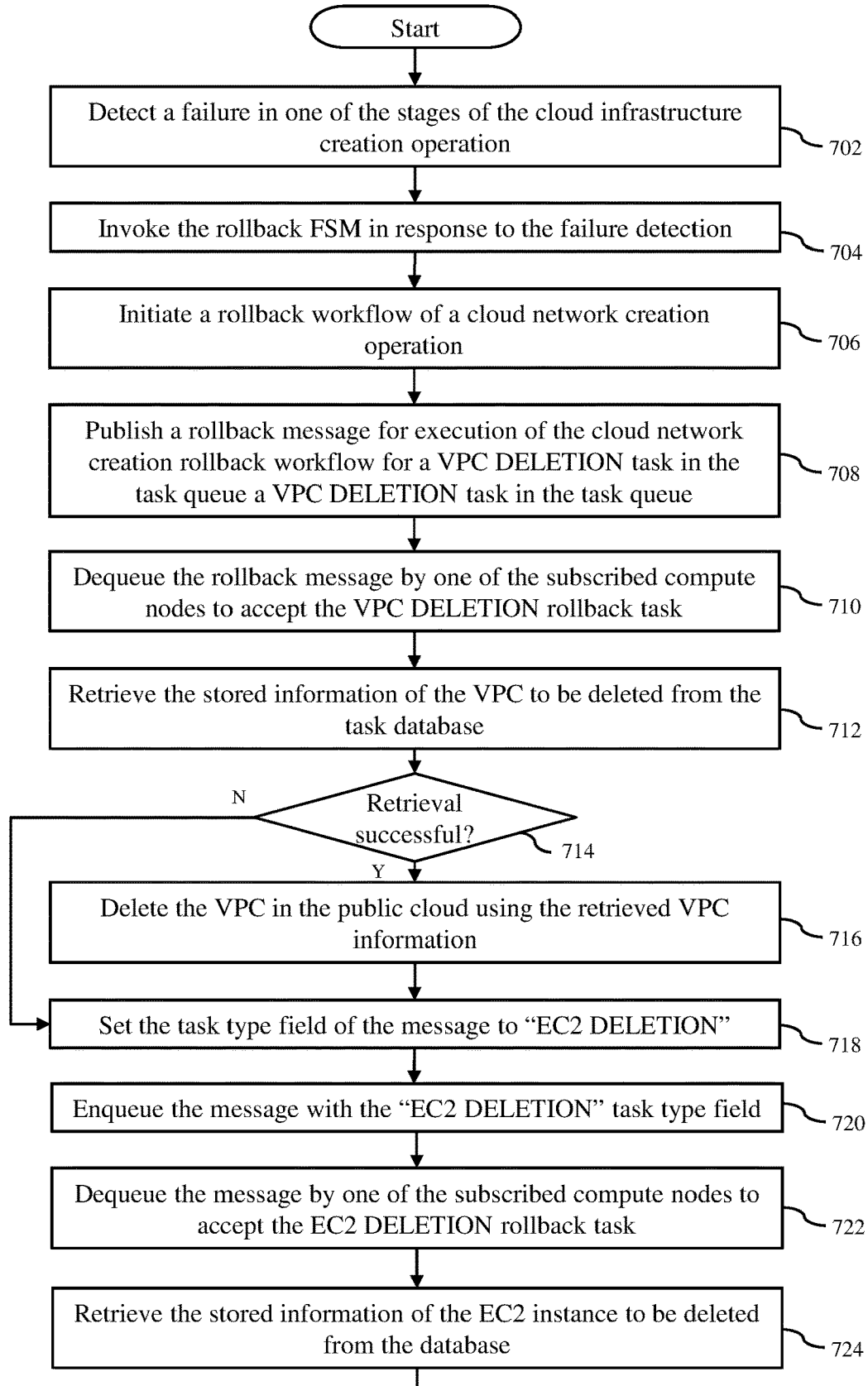
FIGS. 7A, 7B and 7C is a process flow diagram of a rollback process for the multi-stage distributed computing operation for creating a cloud network in a public cloud computing environment executed by the operation execution system of FIG. 3 in accordance with an embodiment of the invention.
Figure 7B:
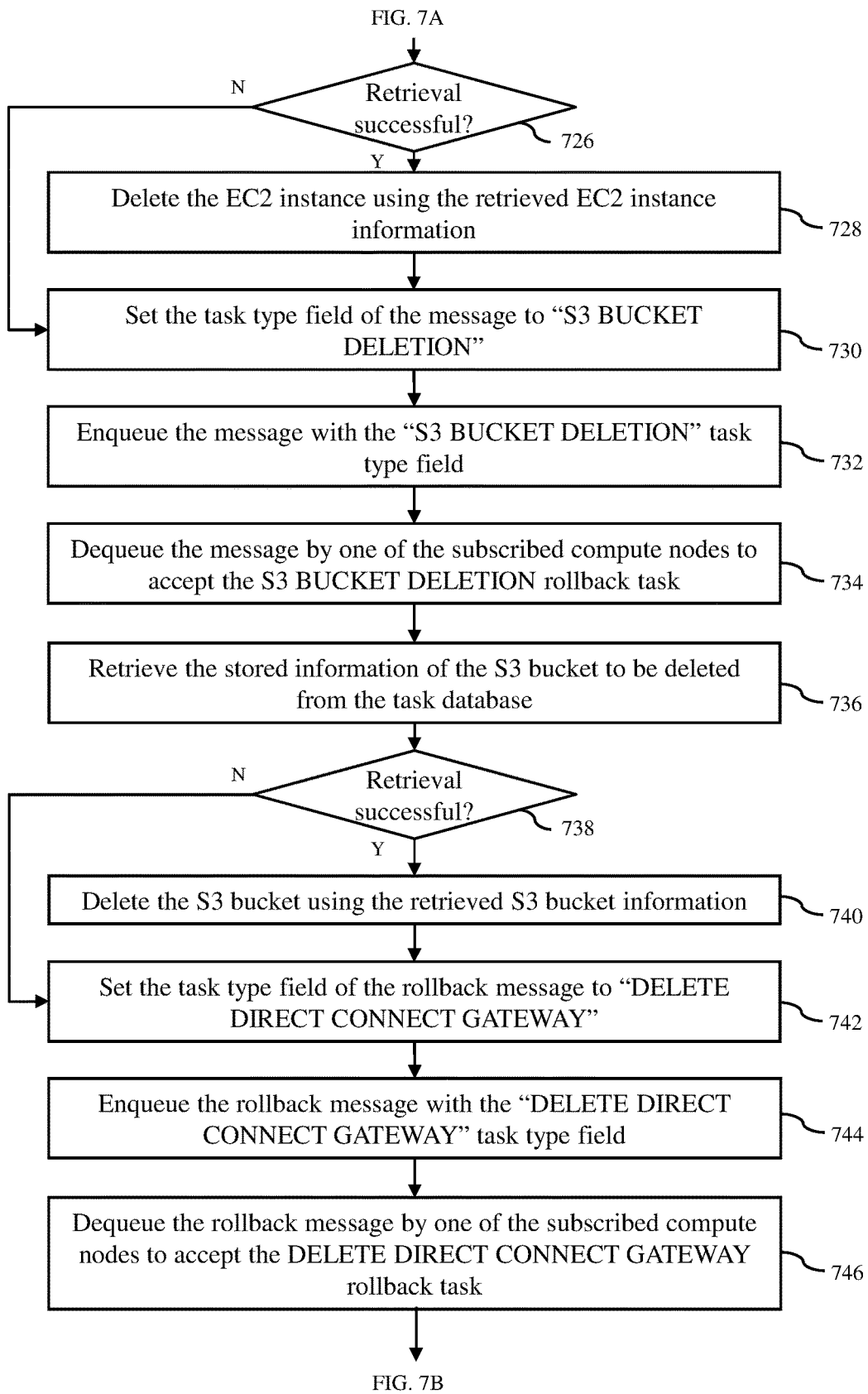
Figure 7C:
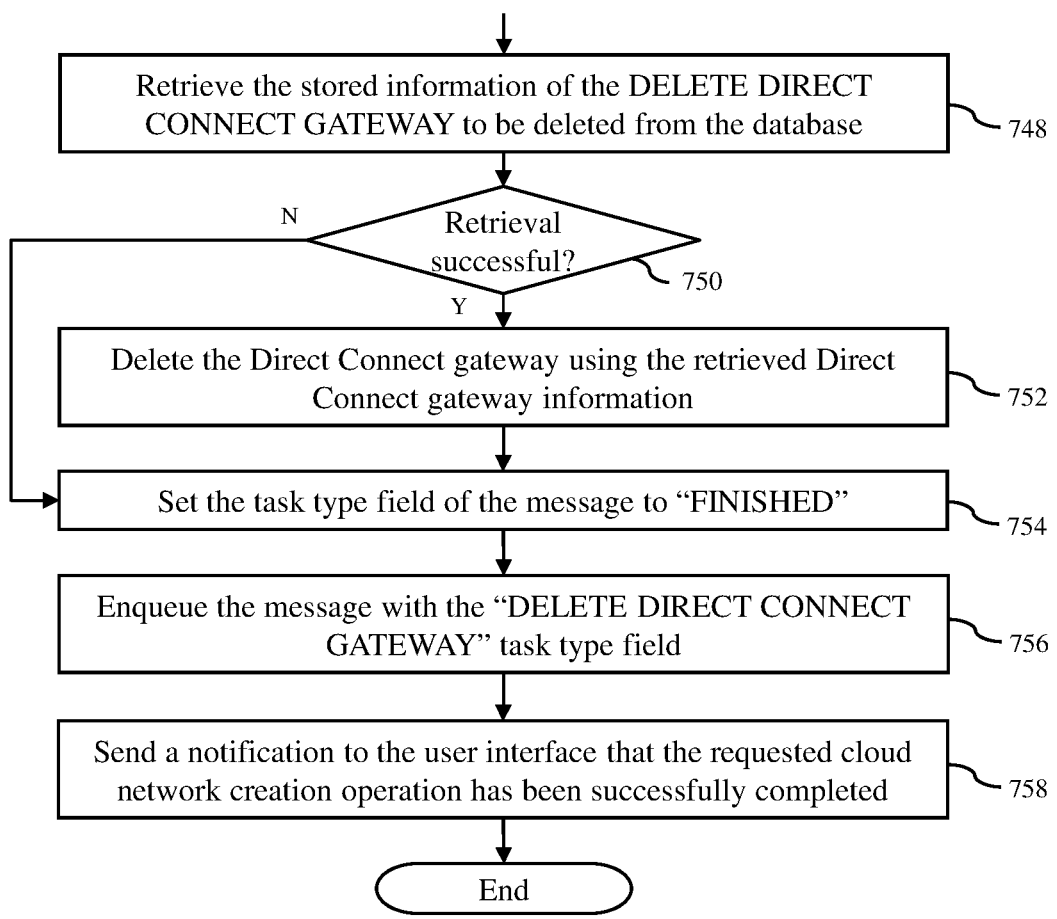

A rollback process for the multi-stage cloud network creation operation executed by the operation execution system 300 in accordance with an embodiment of the invention is described with reference to a process flow diagram of FIGS. 7A-7C. The rollback process begins at step 702, where a failure in one of the stages of the cloud network creation operation is detected by the FSM orchestrator 302.

Next, at step 704, the rollback FSM 306 is invoked by the FSM orchestrator in response to the failure detection to execute a rollback workflow for the failed. As part of this step, instructions may be transmitted from the FSM orchestrator 302 to the rollback FSM 306 to execute the rollback workflow. The instructions may include at least the ID of the failed cloud network creation operation.

Next, at step 706, the rollback workflow of the failed cloud network creation operation is initiated by the rollback FSM 306. As part of this step, information regarding the failed operation workflow for the cloud network creation operation may be processed to create a rollback message, which is used to distribute rollback tasks to the service compute nodes 312. In an embodiment, the rollback message may include the ID of the failed operation workflow for the cloud network creation operation and at least a task type field, which includes one of the rollback tasks of the rollback workflow that needs to be executed or information that all the rollback tasks of the rollback workflow for the cloud network creation operation have been completed. For the failed cloud network creation operation, the rollback workflow includes a chain of rollback tasks, which includes a first rollback task to roll back the VPC creation task, a second rollback task to roll back the EC2 instance creation task, a third rollback task to roll back the S3 bucket creation task and a fourth rollback task to roll back the Direct Connect gateway creation task.

Next, at step 708, the rollback message for execution of the rollback workflow is published or enqueued by the rollback FSM 306 in the task queue 310 for the subscribed compute nodes 312 of the operation execution system 300. Similar to the task message for execution of the cloud network creation operation, the rollback message for the execution of the rollback workflow includes a task type field, which indicates the rollback task of the cloud network creation rollback workflow that needs to be executed. In an embodiment, the task type field of the message is initially set to "VPC DELETION", which indicates that the rollback task to be executed is the deletion of the VPC that has been created in the public cloud during the operation workflow of the cloud network creation operation. In another embodiment, the rollback message may be published in another queue that is distinct and separate from the task queue 310. In this embodiment, the task queue 310 would be used only for task messages and the other queue would be used only for rollback messages.

Next, at step 710, the message with the VPC DELETION task type field is dequeued from the task queue 310 by one of the subscribed compute nodes 312 to accept and handle the VPC DELETION rollback task.

Next, at step 712, the stored information regarding the VPC to be deleted is retrieved from the task database 308 by the handling compute node 312. The search of the task database 308 for the information regarding the VPC of interest may involve using the main ID of the cloud network creation operation to search for and retrieve the VPC information, including the ID of the VPC.

Next, at step 714, a determination is made by the handling compute node 312 whether the retrieval of the VPC information from the task database 308 was successful. If the retrieval was successful, the process proceeds to step 716, where the VPC in the public cloud is deleted by the handling compute node using the retrieved information regarding the VPC. In an embodiment, the deletion of a VPC may involve communicating with AWS cloud to delete the VPC using the ID of the VPC.

However, if the retrieval was not successful, the process proceeds to step 718, skipping step 716. Thus, if the retrieval was not successful, the rollback process merely continues to try to roll back another stage of the cloud network creation operation, which may be the next task of the cloud network creation operation to be rolled back.

Next, at step 718, the task type field of the rollback message is set to a "EC2 DELETION" task, which is the second rollback task of the cloud network creation rollback workflow, by the handling compute node 312. Thus, the task type field of the rollback task is changed from "VPC DELETION" to "EC2 DELETION".

Next, at step 720, the rollback message is enqueued back in the task queue 310 by the handling compute node 312 so that the next task, i.e., the "EC2 DELETION" rollback task, can be handled by another compute node 312.

Next, at step 722, the rollback message with the EC2 DELETION task type field is dequeued from the task queue 310 by one of the subscribed compute nodes 312 to accept and handle the EC2 DELETION rollback task.

Next, at step 724, the stored information regarding the EC2 instance to be deleted is retrieved from the task database 308 by the handling compute node 312. The EC2 information retrieval from the task database 308 may involve using the main ID of the cloud network creation operation to search for and retrieve the EC2 information, including the ID of the EC2 instance.

Next, at step 726, a determination is made by the handling compute node 312 whether the retrieval of the EC2 instance information from the task database 308 was successful. If the retrieval was not successful, the process proceeds to step 730, skipping step 728. However, if the retrieval was successful, the process proceeds to step 728, where the EC2 instance is deleted by the handling compute node using the retrieved information regarding the EC2 instance information. In an embodiment, the deletion of the EC2 instance may involve communicating with AWS cloud to delete the EC2 instance using the ID of the EC2 instance.

Next, at step 730, the task type field of the rollback message is set to a "S3 BUCKET DELETION" task, which is the third rollback task of the cloud network creation rollback workflow, by the handling compute node 312. Thus, the task type field of the rollback message is changed from "EC2 DELETION" to "S3 BUCKET DELETION".

Next, at step 732, the rollback message is enqueued back in the task queue 310 by the handling compute node 312 so that the next task, i.e., the "S3 BUCKET DELETION" rollback task, can be handled by another compute node 312.

Next, at step 734, the rollback message with the S3 BUCKET DELETION task type field is dequeued from the task queue 310 by one of the subscribed compute nodes 312 to accept and handle the S3 BUCKET DELETION rollback task.

Next, at step 736, the stored information regarding the S3 bucket to be deleted is retrieved from the task database 308 by the handling compute node 312. The S3 bucket information retrieval from the task database 308 may involve using the main ID of the cloud network creation operation to search for and retrieve the S3 bucket information, including the ID of the S3 bucket.

Next, at step 738, a determination is made by the handling compute node 312 whether the retrieval of the S3 bucket information from the task database 308 was successful. If the retrieval was not successful, the process proceeds to step 742, skipping step 740. However, if the retrieval was successful, the process proceeds to step 740, where the S3 bucket is deleted by the handling compute node using the retrieved information regarding the S3 bucket. In an embodiment, the deletion of the S3 bucket may involve communicating with AWS cloud to delete the S3 bucket using the ID of the S3 bucket.

Next, at step 742, the task type field of the rollback message is set to a "DELETE DIRECT CONNECT GATEWAY" task, which is the fourth rollback task of the cloud network creation rollback workflow, by the handling compute node 312. Thus, the task type field of the rollback message is changed from "S3 BUCKET DELETION" to "DELETE DIRECT CONNECT GATEWAY".

Next, at step 744, the rollback message is enqueued back in the task queue 310 by the handling compute node 312 so that the next task, i.e., the "DELETE DIRECT CONNECT GATEWAY" rollback task, can be handled by another compute node 312.

Next, at step 746, the rollback message with the DELETE DIRECT CONNECT GATEWAY task type field is dequeued from the task queue 310 by one of the subscribed compute nodes 312 to accept and handle the DELETE DIRECT CONNECT GATEWAY rollback task.

Next, at step 748, the stored information regarding the Direct Connect gateway to be deleted is retrieved from the task database 308 by the handling compute node 312. The Direct Connect gateway information retrieval from the task database 308 may involve using the main ID of the cloud network creation operation to search for and retrieve the Direct Connect gateway information, including the ID of the Direct Connect gateway.

Next, at step 750, a determination is made by the handling compute node 312 whether the retrieval of the Direct Connect gateway information from the task database 308 was successful. If the retrieval was not successful, the process proceeds to step 754, skipping step 752. However, if the retrieval was successful, the process proceeds to step 752, where the Direct Connect gateway is deleted by the handling compute node using the retrieved information regarding the Direct Connect gateway. In an embodiment, the deletion of the Direct Connect gateway may involve communicating with AWS cloud to delete the Direct Connect gateway using the ID of the Direct Connect gateway.

Next, at step 754, the task type field of the rollback message is set to "FINISHED", which indicates that all the rollback tasks for the cloud network creation rollback workflow have been completed, by the handling compute node 312. Thus, the task type field is changed from "DELETE DIRECT CONNECT GATEWAY" to "FINISHED".

Next, at step 756, the rollback message is enqueued back in the task queue 310 by the handling compute node 312 so that the FSM orchestrator 302 and the task FSM 304 will know that all the rollback tasks for the cloud network creation rollback workflow have been completed.

Next, at step 758, a notification is sent to the requesting user interface from the FSM orchestrator 302 or the task FSM 304 that a rollback of the cloud network creation operation has been executed. The process then comes to an end.

Below is an example of a pseudo code that can be executed by a handling compute node for the rollback process.

```
if (taskType == 'VPC_DELETION') {
    // get VPC information from DB
    // delete the vpc in AWS
    setTaskType(EC2_DELETION)
    // enqueue message
} else if (taskType == 'EC2_DELETION') {
    // get EC2 details from DB
    // delete EC2 in AWS
    setTaskType(S3_BUCKET_DELETION)
    // enqueue message
} else if (taskType == 'S3_BUCKET_DELETION') {
    // get S3 bucket details in DB
    // delete S3 from AWS
    setTaskType('DELETE_DIRECT_CONNECT_GATEWAY')
    // enqueue message
} else if (taskType == 'DELETE_DIRECT_CONNECT_GATEWAY') {
    // get direct connect gateway from DB
    // delete direct connect from AWS
    setTaskType('FINISHED')
// enqueue message
}
```

Figure 8:
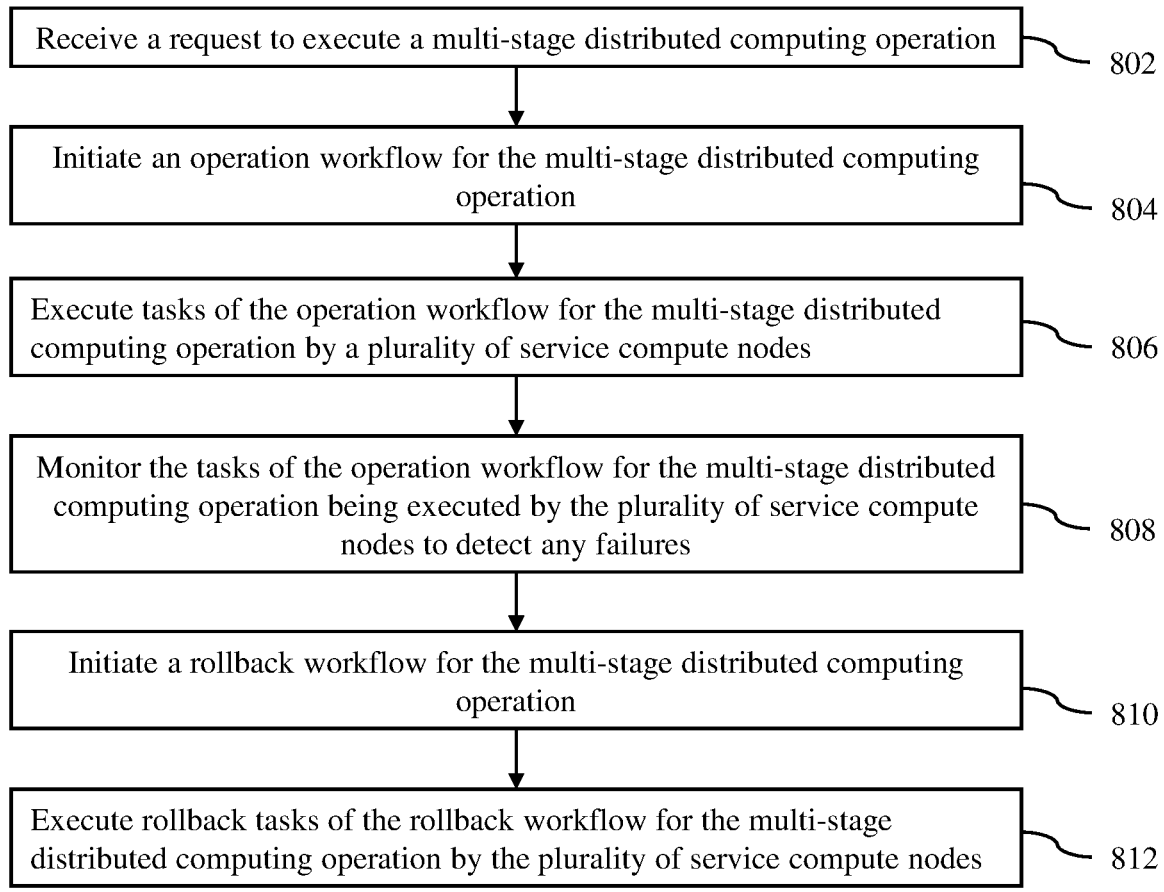
FIG. 8 is a flow diagram of a computer-implemented method for executing multi-stage distributed computing operations in accordance with an embodiment of the invention.

A computer-implemented method for executing multi-stage distributed computing operations in accordance with an embodiment of the invention is described with reference to a flow diagram of FIG. 8. At block 802, a request to execute a multi-stage distributed computing operation is received. In an embodiment, the request may be from the user interface 314 and received at the FSM orchestrator 302 of the operation execution system 300. At block 804, an operation workflow for the multi-stage distributed computing operation is initiated. The operation workflow includes tasks of the multi-stage distributed computing operation. In an embodiment, the multi-stage distributed computing operation is initiated by the FSM orchestrator 302 of the operation execution system 300. At block 806, the tasks of the operation workflow for the multi-stage distributed computing operation are executed by a plurality of service compute nodes, e.g., the service compute nodes 312. At block 808, the tasks of the operation workflow for the multi-stage distributed computing operation being executed by the plurality of service compute nodes are monitored to detect any failures. In an embodiment, the tasks of the operation workflow being executed by the plurality of service compute nodes monitored by the FSM orchestrator 302. At block 810, a rollback workflow for the multi-stage distributed computing operation is initiated when a failure of the operation workflow for the multi-stage distributed computing operation is detected. The rollback workflow includes rollback tasks for the multi-stage distributed computing operation that correspond to the tasks of the operation workflow to roll back executed tasks of the operation workflow. The rollback workflow for the multi-stage distributed computing operation is an independent workflow from the operation workflow for the multi-stage distributed computing operation. In an embodiment, the rollback workflow for the multi-stage distributed computing operation is initiated by the FSM orchestrator 302. At block 812, the rollback tasks of the rollback workflow for the multi-stage distributed computing operation are executed by the plurality of service compute nodes, e.g., the service compute nodes.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for executing multi-stage distributed computing operations, the method comprising:

receiving a request to execute a multi-stage distributed computing operation;

initiating an operation workflow for the multi-stage distributed computing operation in response to the received request, the operation workflow including tasks of the multi-stage distributed computing operation;

executing the tasks of the operation workflow for the multi-stage distributed computing operation by a plurality of service compute nodes;

when the last task of the operation workflow has been executed, modifying a message in a task queue to indicate that all the tasks of the operation workflow for the multi-stage distributed computing operation have been completed and enqueuing the modified message in the task queue;

monitoring the tasks of the operation workflow for the multi-stage distributed computing operation being executed by the plurality of service compute nodes to detect any failures;

initiating a rollback workflow for the multi-stage distributed computing operation when a failure of the operation workflow for the multi-stage distributed computing operation is detected, the rollback workflow including rollback tasks for the multi-stage distributed computing operation that correspond to the tasks of the operation workflow to roll back executed tasks of the operation workflow, wherein the rollback workflow is an independent workflow from the operation workflow; and executing the rollback tasks of the rollback workflow for the multi-stage distributed computing operation by the plurality of service compute nodes.

2. The method of claim 1, wherein the service compute nodes are microservices or serverless functions.

3. The method of claim 1, wherein executing the tasks of the operation workflow for multi-stage distributed computing operation includes storing identification of a software object created during execution of a particular task of the operation workflow in a database and associating the stored identification of the software object with a main identification of the multi-stage distributed computing operation.

4. The method of claim 3, wherein executing the rollback tasks of the rollback workflow for the multi-stage distributed computing operation includes retrieving the stored identification of the software object from the database using the main identification of the multi-stage distributed computing operation to delete the software object.

5. The method of claim 1, further comprising enqueuing the message with a specified task of the operation workflow for the multi-stage distributed computing operation in the task queue for one of the service compute nodes to execute the specified task.

6. The method of claim 5, further comprising:

after executing the specified task, updating the message to replace the specified task with another task of the operation workflow for the multi-stage distributed computing operation; and enqueuing the updated message in the task queue for one of the service compute nodes to execute the another task of the updated message.

7. The method of claim 1, further comprising, when the last rollback task of the rollback workflow has been executed, modifying a rollback message in the task queue to indicate that all the rollback tasks of the rollback workflow for the multi-stage distributed computing operation have been completed and enqueuing the modified rollback message in the task queue.

8. A non-transitory computer-readable storage medium containing program instructions for a method for executing multi-stage distributed computing operations, wherein execution of the program instructions by one or more processors of a computer system causes the one or more processors to perform steps comprising:
   receiving a request to execute a multi-stage distributed computing operation;
   initiating an operation workflow for the multi-stage distributed computing operation in response to the received request, the operation workflow including tasks of the multi-stage distributed computing operation;
   executing the tasks of the operation workflow for the multi-stage distributed computing operation by a plurality of service compute nodes;
   when the last task of the operation workflow has been executed, modifying a message in a task queue to indicate that all the tasks of the operation workflow for the multi-stage distributed computing operation have been completed and enqueuing the modified message in the task queue;
   monitoring the tasks of the operation workflow for the multi-stage distributed computing operation being executed by the plurality of service compute nodes to detect any failures;
   initiating a rollback workflow for the multi-stage distributed computing operation when a failure of the operation workflow for the multi-stage distributed computing operation is detected, the rollback workflow including rollback tasks for the multi-stage distributed computing operation that correspond to the tasks of the operation workflow to roll back executed tasks of the operation workflow, wherein the rollback workflow is an independent workflow from the operation workflow; and
   executing the rollback tasks of the rollback workflow for the multi-stage distributed computing operation by the plurality of service compute nodes.

9. The computer-readable storage medium of claim 8, wherein the service compute nodes are micro services or serverless functions.

10. The computer-readable storage medium of claim 8, wherein executing the tasks of the operation workflow for multi-stage distributed computing operation includes storing identification of a software object created during execution of a particular task of the operation workflow in a database and associating the stored identification of the software object with a main identification of the multi-stage distributed computing operation.

11. The computer-readable storage medium of claim 10, wherein executing the rollback tasks of the rollback workflow for the multi-stage distributed computing operation includes retrieving the stored identification of the software object from the database using the main identification of the multi-stage distributed computing operation to delete the software object.

12. The computer-readable storage medium of claim 8, wherein the steps further comprise enqueuing an the message with a specified task of the operation workflow for the multi-stage distributed computing operation in the task queue for one of the service compute nodes to execute the specified task.

13. The computer-readable storage medium of claim 12, wherein the steps further comprise:
   after executing the specified task, updating the message to replace the specified task with another task of the operation workflow for the multi-stage distributed computing operation; and
   enqueuing the updated message in the task queue for one of the service compute nodes to execute the another task of the updated message.

14. The computer-readable storage medium of claim 8, wherein the steps further comprise, when the last rollback task of the rollback workflow has been executed, modifying a rollback message in the task queue to indicate that all the rollback tasks of the rollback workflow for the multi-stage distributed computing operation have been completed and enqueuing the modified rollback message in the task queue.

15. A system comprising:
   memory; and
   at least one processor configured to:
      receive a request to execute a multi-stage distributed computing operation;
      initiate an operation workflow for the multi-stage distributed computing operation in response to the received request, the operation workflow including tasks of the multi-stage distributed computing operation;
      execute the tasks of the operation workflow for the multi-stage distributed computing operation by a plurality of service compute nodes;
      when the last task of the operation workflow has been executed, modify a message in a task queue to indicate that all the tasks of the operation workflow for the multi-stage distributed computing operation have been completed and enqueue the modified message in the task queue;
      monitor the tasks of the operation workflow for the multi-stage distributed computing operation being executed by the plurality of service compute nodes to detect any failures;
      initiate a rollback workflow for the multi-stage distributed computing operation when a failure of the operation workflow for the multi-stage distributed computing operation is detected, the rollback workflow including rollback tasks for the multi-stage distributed computing operation that correspond to the tasks of the operation workflow to roll back executed tasks of the operation workflow, wherein the rollback workflow is an independent workflow from the operation workflow; and
      execute the rollback tasks of the rollback workflow for the multi- stage distributed computing operation by the plurality of service compute nodes.

16. The system of claim 15, wherein the at least one processor is configured to store an identification of a software object created during execution of a particular task of the operation workflow in a database and associate the stored identification of the software object with a main identification of the multi-stage distributed computing operation.

17. The system of claim 16, wherein the at least one processor is configured to retrieve the stored identification of the software object from the database using the main identification of the multi-stage distributed computing operation to delete the software object.

18. The system of claim 15, wherein the at least one processor is configured to enqueue the message with a specified task of the operation workflow for the multi-stage distributed computing operation in an the task queue for one of the service compute nodes to execute the specified task.

19. The system of claim 18, wherein the at least one processor is configured to:
   after executing the specified task, update the message to replace the specified task with another task of the operation workflow for the multi-stage distributed computing operation; and
   enqueue the updated message in the task queue for one of the service compute nodes to execute the another task of the updated message.

20. The system of claim 15, wherein the at least one processor is configured to, when the last rollback task of the rollback workflow has been executed, modify a rollback message in the task queue to indicate that all the rollback tasks of the rollback workflow for the multi-stage distributed computing operation have been completed and enqueue the modified rollback message in the task queue.

\* \* \* \* \*